B. IVOR.
STRAINER AND WATER SEPARATOR FOR GASOLENE SUPPLY.
APPLICATION FILED JULY 5, 1911.

1,019,161.

Patented Mar. 5, 1912.

Witnesses:
Chas. E. Gorton
E. Newstrom

Inventor:
Barry Ivor
By Chas. E. Tillman
Atty.

UNITED STATES PATENT OFFICE.

BARRY IVOR, OF CHICAGO, ILLINOIS.

STRAINER AND WATER-SEPARATOR FOR GASOLENE-SUPPLY.

1,019,161. Specification of Letters Patent. Patented Mar. 5, 1912.

Application filed July 5, 1911. Serial No. 636,929.

*To all whom it may concern:*

Be it known that I, BARRY IVOR, a citizen of the United States, residing at Chicago, in the county of Cook and State of Illinois, have invented certain new and useful Improvements in Strainers and Water-Separators for Gasolene-Supply, of which the following is a specification.

This invention relates to improvements in a device, which is particularly intended for use on automobiles or motor boats, between the gasolene supply tank and the carbureter thereof, and in communication with both, for the purpose of removing from the gasolene, before it reaches the carbureter, all water, sediment, and light floating particles or foreign substances, all of which are deleterious to the proper action of the carbureter, and as is well known are contained in most all commercial gasolene, and it consists in certain peculiarities of the construction, novel arrangement and operation of the various parts thereof as will be hereinafter more fully set forth and specifically claimed.

The main object of the invention is to provide a strainer and water separator for gasolene supply which shall be simple and inexpensive in construction, strong, and durable, the parts of which can be readily assembled for use, or detached for cleaning purposes or repairs, and the whole can be easily applied to the supply or pipe.

Another object is to provide a device of the above named character, which shall be of such construction that the separation of water and other foreign substances from the gasolene, will be effected and maintained in such a manner as to prevent mixture thereof by the jolting or movement to which the tank is subjected, as often occurs in devices of this class heretofore in use.

Other objects and advantages of the invention will be disclosed in the subjoined description and explanation.

In order to enable others skilled in the art to which the invention pertains, to make and use the same I will now proceed to describe it referring to the accompanying drawings in which—

Figure 1:
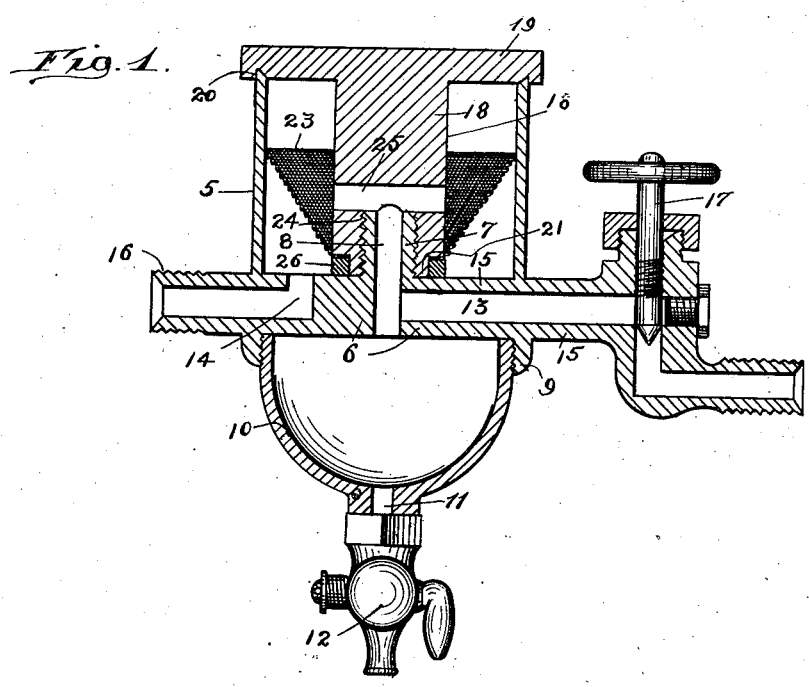
Figure 2:
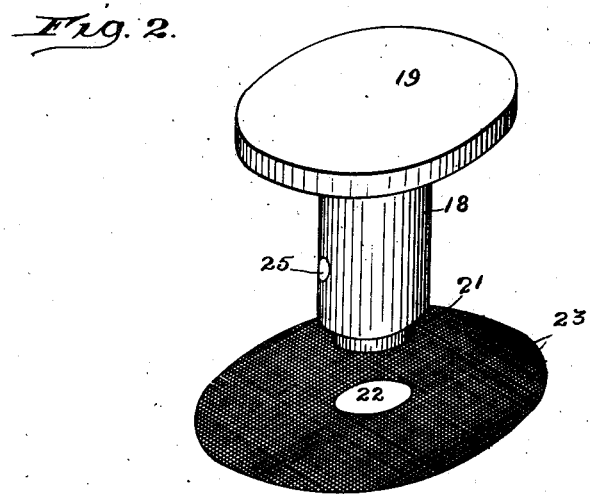
Figure 3:

Figure 1, is a central vertical sectional view of a strainer and water separator for gasolene supply embodying the invention. Fig. 2, is a perspective view of the strainer holder and strainer showing them detached and the latter in the act of being placed on the stem or shank of the former before being inserted into the straining receptacle or compartment, and Fig. 3, is a detached perspective view of a collar used for securing the strainer around the lower end of the strainer holding stem or shank.

Like numerals of reference refer to corresponding parts throughout the different views of the drawing.

The reference numeral 5, designates the straining receptacle for the gasolene, which receptacle may be made of any suitable size, form and material, but preferably cylindrical in shape and with its upper end open. The lower end of the receptacle 5, is closed by means of a bottom 6, preferably integral with the receptacle 5, and has centrally on its upper portion an upwardly extended and externally screw-threaded projection 7, through which, as well as the bottom 6, is formed an opening 8, for the passage of gasolene and water as will be presently explained. The lower surface of the bottom 6, of the receptacle 5, is provided with a downwardly disposed extension 9, which is preferably annular in shape and internally screw-threaded to engage screw threads on the upper portion of a cup or receptacle 10, used for retaining water as it is separated from the gasolene. The receptacle 10, is provided in its lower portion with a discharge opening 11, and a drain cock 12, through which the water may be discharged. As shown in Fig. 1, of the drawing, the bottom 6, is provided with an inlet conduit 13, and an outlet conduit 14, which terminate outwardly in pipe sections 15, and 16, respectively. The inlet section 15, is provided with a valve 17, to be used for regulating the admission of gasolene to the receptacles 5 and 10, and may be of the ordinary needle valve type as shown, or of any other desirable construction. The outer portion of the pipe section 15, is adapted for communication and connection with a pipe leading from the gasolene supply tank, not shown, and the outer portion of the outlet pipe section 16, is adapted for communication and connection with a pipe leading to the carbureter, not shown.

Located on the channeled extension or projection 7, is the strainer holder and cover for the receptacle 5, which consists of a stem or shank 18, centrally located on the lower surface of a plate or cover 19, which has on its lower surface near its periphery an annular groove 20, to receive the rim of the receptacle 5, when the parts are secured in place, thus tightly closing said receptacle. The lower portion of the stem or shank 18, is formed with a neck or reduced portion 21, which is inserted in a central opening 22, in the strainer 23, which is made of wire cloth or other suitable material, and which is preferably circular in shape as shown in Fig. 2, of the drawing. The lower end of the stem or shank 18, is provided with a screw-threaded socket or opening 24, to receive and engage the extension 7, on the upper surface of the bottom of the receptacle 5, and said stem or shank is provided at the upper end of the opening 24, with passageways 25, which communicate with the opening 8, and through the same with the conduit 13, and cavity of the receptacle 10, for the water. The conduit 14, communicates at its inner end with the cavity of the receptacle 5, and will receive and conduct the gasolene after it has been separated from the water and other foreign substances, to the carbureter.

In assembling the parts of the device, the receptacle 10, is fastened to the extension 9, on the bottom of the receptacle 5, after which the neck or reduced portion 21, of the strainer holder may be inserted into the opening 22, of the strainer 23, when by placing the collar 26, on the neck 21, which collar is snugly fitted on said neck, it is apparent that the strainer 23, will be securely fastened to the stem or shank 18, when the latter may be fitted on the extension 7, in which operation the edges of the strainer will come in contact with the inner surface of the walls of the receptacle 5, and be supported thereby, thus forming a funnel-shaped strainer as is clearly shown in Fig. 1, of the drawing, in which view it is obvious that the plate or cover 19, will tightly close the upper end of the strainer receptacle.

The operation of the device is as follows: When the parts have been assembled as above stated, gasolene may be supplied to the receptacles 5 and 10, and the quantity or flow thereof regulated by means of the valve 17, in the inlet conduit. As the gasolene flows through the conduit 13, it is apparent that it will pass into the receptacle 10, until the latter is filled and from thence it will pass through the openings 8, and 25, into the vessel 5, but inwardly of the strainer 23, through which it will pass, and by means of which it will be strained, thus permitting it to pass out through the outlet conduit 14, and be led to the carbureter. The water contained in the gasolene, being of greater specific gravity than the gasolene will remain in the receptacle 10, and the floating particles or other lighter foreign substances will pass up with the gasolene through the opening 8, into the strainer 23, and from thence out through the conduit 14, to the carbureter, in which operation it is apparent that a thorough separation of water and foreign substances, from the gasolene, will be effected. As the receptacle 10, is located some distance below the discharging end of the opening 8, and as the particles separated from the gasolene by means of the strainer 23, will gravitate toward the tapered end of the funnel-shaped strainer 23, and below the openings 25, in the stem of the strainer holder it is obvious that re-mixture of the water and separated particles with the gasolene, will be prevented, thus permitting pure gasolene to be supplied to the carbureter through the outlet conduit of the strainer and separator.

Having thus fully described my invention what I claim as new and desire to secure by Letters-Patent is—

1. A device of the class described consisting of a vessel having inlet and outlet openings, a channeled projection extended upwardly within the vessel between said openings and communicating with the inlet opening, a strainer holder having a stem adapted for engagement with said projection and a cover to close said vessel, said stem having a passageway leading from its outer surface to the channel of said projection, and a strainer located around said stem and extended at its outer edges toward the walls of said vessel.

2. A device of the class described consisting of a vessel having an inlet and an outlet opening, a channeled projection extended upwardly within the vessel between said openings and communicating with the inlet opening, a funnel-shaped strainer located at its lower end around the lower portion of said projection, and means to hold said strainer in position and to close the upper end of the vessel.

3. A device of the class described consisting of a vessel having an inlet and an outlet opening, a channeled projection extended upwardly within the vessel between said openings and communicating with the inlet opening, a funnel-shaped strainer located at its lower end around the lower portion of said projection, means to hold said strainer in position and to close the upper end of said vessel, and a receptacle mounted on the lower portion of said vessel and having communication with the inlet opening thereof.

4. A device of the class described consisting of a vessel having an inlet and an outlet opening, a channled projection extended upwardly within the vessel between said openings and communicating with the inlet opening, a receptacle mounted on the lower portion of said vessel and having communication with the inlet opening thereof, a strainer holder having a stem adapted for engagement with said projection and a cover to close said vessel, said stem having a passageway leading from its outer surface to the channel of the projection, and a strainer located around said stem and extended at its outer edges upwardly and toward the walls of said vessel.

5. A device of the class described consisting of a vessel having an inlet and an outlet opening, a channeled projection extended upwardly within the vessel between said openings and communicating with the inlet opening, a strainer holder having a channeled stem adapted for detachable engagement with said projection and a cover for said vessel, the channel of said stem affording communication between said vessel and the channel of said projection, a strainer surrounding the lower portion of said stem, and means to secure the strainer thereon.

BARRY IVOR.

Witnesses:
   CHAS. C. TILLMAN,
   E. NEWSTROM.